Feb. 4, 1936.　　K. MUHLEISEN　　2,029,633
FLOW INDICATOR
Filed Sept. 24, 1934
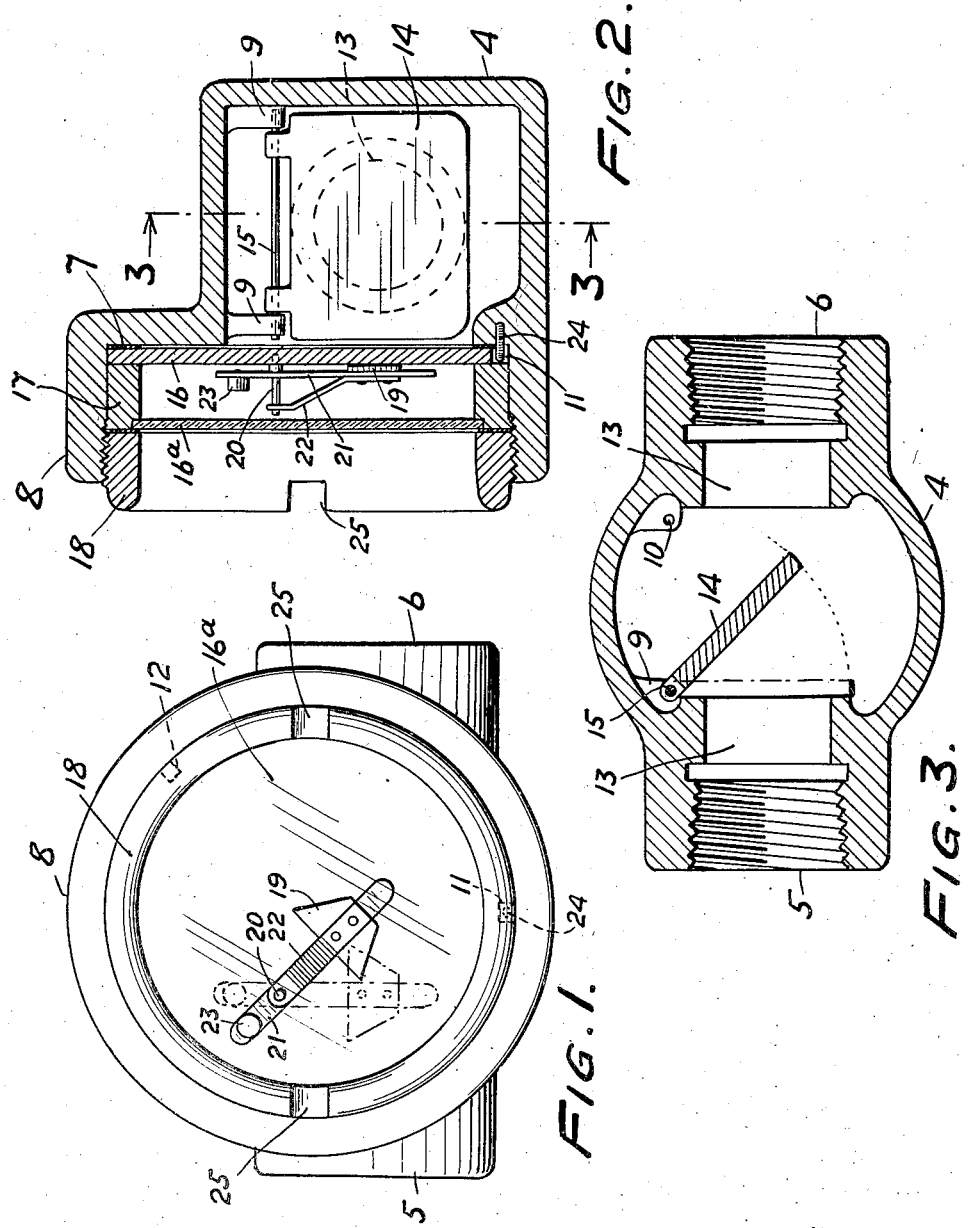
WITNESS:
Robt R Kitchel
INVENTOR
Karl Muhleisen
BY
Augustus B. Stoughton,
ATTORNEY.

Patented Feb. 4, 1936

2,029,633

UNITED STATES PATENT OFFICE 2,029,633

FLOW INDICATOR

Karl Muhleisen, Philadelphia, Pa., assignor to Schutte & Koerting Company, Philadelphia, Pa., a corporation of Pennsylvania Application September 24, 1934, Serial No. 745,375

3 Claims. (Cl. 116—117)

Objects of the present invention are to provide a flow indicator for insertion into a pipe line and which may be made of materials stronger and less fragile than glass, although opaque, and which shall be devoid of glands, stuffing boxes and the like, and proof against leakage; to provide for a clear and accurate indication of flow; to adapt the indicator for flow in either direction by a few simple and easily understood adjustments; and to provide a flow indicator of simple and durable construction and which shall be accurate and reliable in use.

Other objects of the invention will appear from the following description at the end of which the invention will be claimed.

Generally stated, the invention consists of a hollow casing adapted for insertion in a pipe line and composed of opaque diamagnetic material and provided internally with a magnetic clapper movable in response to flow, and externally with a pivoted magnetic indicator disposed in the magnetic field of the clapper and following the movements thereof.

The invention also consists in the improvements to be presently described and finally claimed.

In the following description reference will be made to the accompanying drawing forming part hereof and in which:

Figure 1 is a front view of a magnetic flow indicator embodying features of the invention and showing in dotted lines the no flow position of the indicator.

Fig. 2 is a transverse sectional view of the same, and

Fig. 3 is a sectional view taken on the line 3—3 of Fig. 2.

In the drawing, 4, generally indicates a hollow casing of diamagnetic and opaque material other than glass which, although transparent, is brittle and fragile and therefore objectionable. The casing 4, is shown as generally rectangular and is provided at opposite ends with cylindrical pipe connections 5 and 6, and centrally with a lateral opening having a flanged circular seat 7, and an internally threaded sleeve extension 8. The casing is also internally provided with spaced depending lugs arranged in aligned pairs 9 and 10, and with guide holes 11 and 12. 13, is a fluid-way extending through the casing.

14 is a generally rectangular clapper of magnetized material, and it is disposed in the fluid way 13, and pivoted by means of a detachable pin 15 from the lugs 9 or 10 according to the direction of flow. In the drawing the flow is from left to right and the clapper is pivotally suspended from the lugs 9. If the flow were in the other direction use would be made of the lugs 10 for this purpose.

16 is a door of diamagnetic opaque material, and it closes the lateral opening provided in the casing, thus completely enclosing the fluid way against possible leakage. The door 16 is seated upon the seat 7. The spacer ring 17, and the clamping ring 18, serve to removably secure the door 16 in position. Between the rings 17 and 18 is interposed a glass or other transparent window 16a, and a cushioning gasket. In the space between the door and glass 16a is arranged an indicator 19 of magnetic material. The indicator is pivotally supported by a pin 20, aligned with the pin 15, and projecting from the door 16. The indicator is bifurcated and the spaced arms 21 and 22 receive the pin 20 and provide a long bearing for the indicator. The indicator is counterbalanced by a weight 23, applied to the arm 21. The indicator confronts the edge of the clapper 14 and is substantially of equal length with that edge.

The door is provided with a pin 24, adapted to enter either of the holes 11 or 12 in the seat 7 of the casing according to the direction of flow through the same.

In use the clapper 14, is turned and positioned by the flow of liquid through the casing, and since it and the indicator are of magnetic material, and since one of them, the clapper in the present instance, is magnetized, the indicator follows the movements of the clapper and shows the condition of flow of the liquid.

Since the indicator and clapper depend from aligned pivots, the air gap between them is never sufficient to permit the indicator to lag for any objectionable length of time behind the clapper, and the fact that the indicator confronts the edge of the clapper and is of considerable length facilitates the described operation. The indicator swings with very little friction and its long bearing opposes its being drawn sidewise towards the clapper. Although door 16 tightly seals the opening in the casing it can be readily removed to afford access to and removal and replacement of the clapper. The notches 25, in the ring 18, accommodate a tool and facilitate the removal and application of the ring 18.

If the fluids dealt with are corrosive the clapper and casing may be coated with diamagnetic material, as lead.

It will be observed to those skilled in the art to which the present invention relates that modifications may be made in details of construction and arrangement and matters of mere form without departing from the spirit of the invention which is not limited to such matter or otherwise than the prior art and the appended claims may require.

I claim:

1. A fluid flow indicator comprising a diamagnetic casing of opaque material having a fluid-way, a magnetic clapper pendant in the fluid-way, spaced pivotal supports from one of which the clapper is suspended for flow in one direction and from the other of which the clapper is suspended for flow in the other direction, one of the wall elements of the casing being turnable, and a magnetic indicator pivotally suspended from the outside of said turnable wall element which is adapted to be turned to position the pivotal support for flow in either direction.

2. A fluid flow indicator comprising a casing of opaque diamagnetic material having a fluid-way, a magnetic clapper pivotally pendant in the fluid-way, a magnetic bifurcated indicator arranged outside of the casing and in the magnetic field of the clapper and opposite one edge thereof, and a support for the indicator comprising a pin projecting from the outside of the casing and penetrating the arms of the bifurcation.

3. A fluid flow indicator comprising the combination of a hollow casing of opaque diamagnetic material and having a fluid-way and provided with a circular seat and sleeve defining an opening, a magnetized clapper depending in the fluid-way, a diamagnetic opaque door seated on the seat, a spacer ring and a clamping ring arranged in the sleeve, a window interposed between the rings with space between it and the door, and an indicator of magnetic material suspended from the door and arranged between the door and window and in the magnetic field of the clapper.

KARL MUHLEISEN.